(12) United States Patent
Morioka (10) Patent No.: US 11,325,259 B2
(45) Date of Patent: May 10, 2022

(54) MONITOR SYSTEM FOR ROBOT AND ROBOT SYSTEM

(71) Applicant: FANUC CORPORATION, Yamanashi (JP)

(72) Inventor: Masahiro Morioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 169 days.

(21) Appl. No.: 16/689,391

(22) Filed: Nov. 20, 2019

(65) Prior Publication Data

US 2020/0171662 A1 Jun. 4, 2020

(30) Foreign Application Priority Data

Nov. 30, 2018 (JP) .............................. JP2018-224753

(51) Int. Cl.
*B25J 9/16* (2006.01)

(52) U.S. Cl.
CPC ........... *B25J 9/1676* (2013.01); *B25J 9/1694* (2013.01)

(58) Field of Classification Search
CPC ...... B25J 9/1676; B25J 9/1694; B25J 9/1602; B25J 9/1697; B25J 9/1684; B25J 13/08; G05B 2219/40544; G05B 19/4061; G05B 2219/40203; G05B 2219/40202; G05B 2219/40264

See application file for complete search history.

(56) References Cited

U.S. PATENT DOCUMENTS

| 10,451,400 B2* | 10/2019 | Ruck ....................... G01B 21/04 |
| 2009/0030549 A1* | 1/2009 | Sakai ....................... B25J 19/06 |
| | | 700/245 |
| 2011/0301757 A1* | 12/2011 | Jones ....................... B60L 50/66 |
| | | 700/258 |

(Continued)

FOREIGN PATENT DOCUMENTS

| JP | S58171290 A | 10/1983 |
| JP | 2000202790 A | 7/2000 |

(Continued)

OTHER PUBLICATIONS

Okazaki Haruo, Tajima Hitoshi; JPS58171290 as submitted in the IDS with annotations (page numbers) added by examiner; Oct. 7, 1983 (Year: 1983).*

(Continued)

*Primary Examiner* — Abby Y Lin
*Assistant Examiner* — Danielle Marie Jackson
(74) *Attorney, Agent, or Firm* — Maier & Maier, PLLC (57) ABSTRACT

A monitor system for a robot that includes a base installed on an installation surface, and a movable part supported movably with respect to the base, the monitor system including: a sensor that monitors the presence or absence of an object around the robot; and a monitored region control part that controls a monitored region of the sensor based on a motion command signal for the robot. The sensor has the monitored region on each of both sides across a vertical plane that includes a central axis line of the movable parts, and the monitored region control part makes the monitored region at the rear in a moving direction of the movable part smaller than the monitored region at the front in the moving direction of the movable part.

9 Claims, 11 Drawing Sheets

(56) References Cited

U.S. PATENT DOCUMENTS

| | | | |
|---|---|---|---|
| 2014/0277723 A1* | 9/2014 | Nishimura | B25J 9/1676 |
| | | | 700/255 |
| 2015/0066208 A1 | 3/2015 | Lu | |
| 2016/0206170 A1* | 7/2016 | Yi | A47L 9/2852 |
| 2016/0236347 A1* | 8/2016 | Shikina | B25J 5/007 |
| 2017/0140491 A1 | 5/2017 | Hayashi et al. | |
| 2017/0157783 A1 | 6/2017 | Ogawa | |
| 2018/0333869 A1* | 11/2018 | Ding | B25J 19/026 |
| 2019/0030716 A1* | 1/2019 | Chevallereau | B25J 9/1676 |
| 2019/0250304 A1* | 8/2019 | Yoon | B25J 9/1674 |

FOREIGN PATENT DOCUMENTS

| | | | | |
|---|---|---|---|---|
| JP | 2011-125975 A | | 6/2011 | |
| JP | 2012245575 A | | 12/2012 | |
| JP | 2017080845 A | | 5/2017 | |
| JP | 2017-94409 A | | 6/2017 | |
| JP | 2017205819 A | * | 11/2017 | B25J 9/1676 |
| JP | 2018126818 A | | 8/2018 | |
| WO | 2018131237 A1 | | 7/2018 | |

OTHER PUBLICATIONS

Japanese Office Action dated Apr. 6, 2021, in connection with corresponding JP Application No. 2018-224753 (9 pp., including machine-generated English translation).

Japanese Search Report dated Mar. 26, 2021, in connection with corresponding JP Application No. 2018-224753 (21 pp., including machine-generated English translation).

* cited by examiner

MONITOR SYSTEM FOR ROBOT AND ROBOT SYSTEM

CROSS-REFERENCE TO RELATED APPLICATIONS

This application is based on Japanese Patent Application No. 2018-224753, the content of which is incorporated herein by reference.

FIELD

The present invention relates to a monitor system for a robot and a robot system.

BACKGROUND

For preventing interference between a robot and a human around the robot, generally, the entry of the human into the motion range of the robot has been prevented by surrounding the entire outer periphery of the motion range with a safety fence and disposing a sensor on a door provided in the doorway of the safety fence to detect the opening and closing of the door. On the other hand, in the case of a collaborative robot that works in cooperation with a human, it is possible to operate the robot without the safety fence in a manner as follows: when no human is around the robot, the robot is put in motion at a high speed; and when a human comes close to the robot, a safety mode is set to lower the motion speed of the robot and enable a contact stop function.

Further, there is known a technique of detecting an operator located around the robot by using a camera disposed above the robot or a laser sensor mounted at the wrist tip of the robot (e.g., see Japanese Unexamined Patent Application, Publication No. 2017-94409).

SUMMARY

One aspect of the present invention is directed to a monitor system for a robot that includes a base installed on an installation surface, and a movable part supported movably with respect to the base, the monitor system including: a sensor that monitors the presence or absence of an object around the robot, and a monitored region control part that controls a monitored region of the sensor based on a motion command signal for the robot. The sensor has the monitored region on each of both sides across a vertical plane that includes a central axis line of the movable part, and the monitored region control part makes the monitored region at the rear in a moving direction of the movable part smaller than the monitored region at the front in the moving direction of the movable part.

Further, another aspect of the present invention is directed to a robot system including: a robot provided with a base installed on an installation surface, and a movable part supported movably with respect to the base; a controller that controls the robot; a sensor that monitors the presence or absence of an object around the robot; and a monitored region control part that controls a monitored region of the sensor based on a motion command signal for the robot from the controller. The sensor has the monitored region on each of both sides across a vertical plane that includes a central axis line of the movable part, the monitored region control part controls the monitored region at a rear in a moving direction of the movable part to be smaller than the monitored region at a front in the moving direction of the movable part, and the controller stops or decelerates the robot, or controls a motion of the robot so as to avoid contact with the object, based on a detection signal for the object from the sensor.

DETAILED DESCRIPTION

A monitor system 4 for a robot 2 and a robot system 1 according to an embodiment of the present invention will be described below with reference to the drawings.

Figure 1:
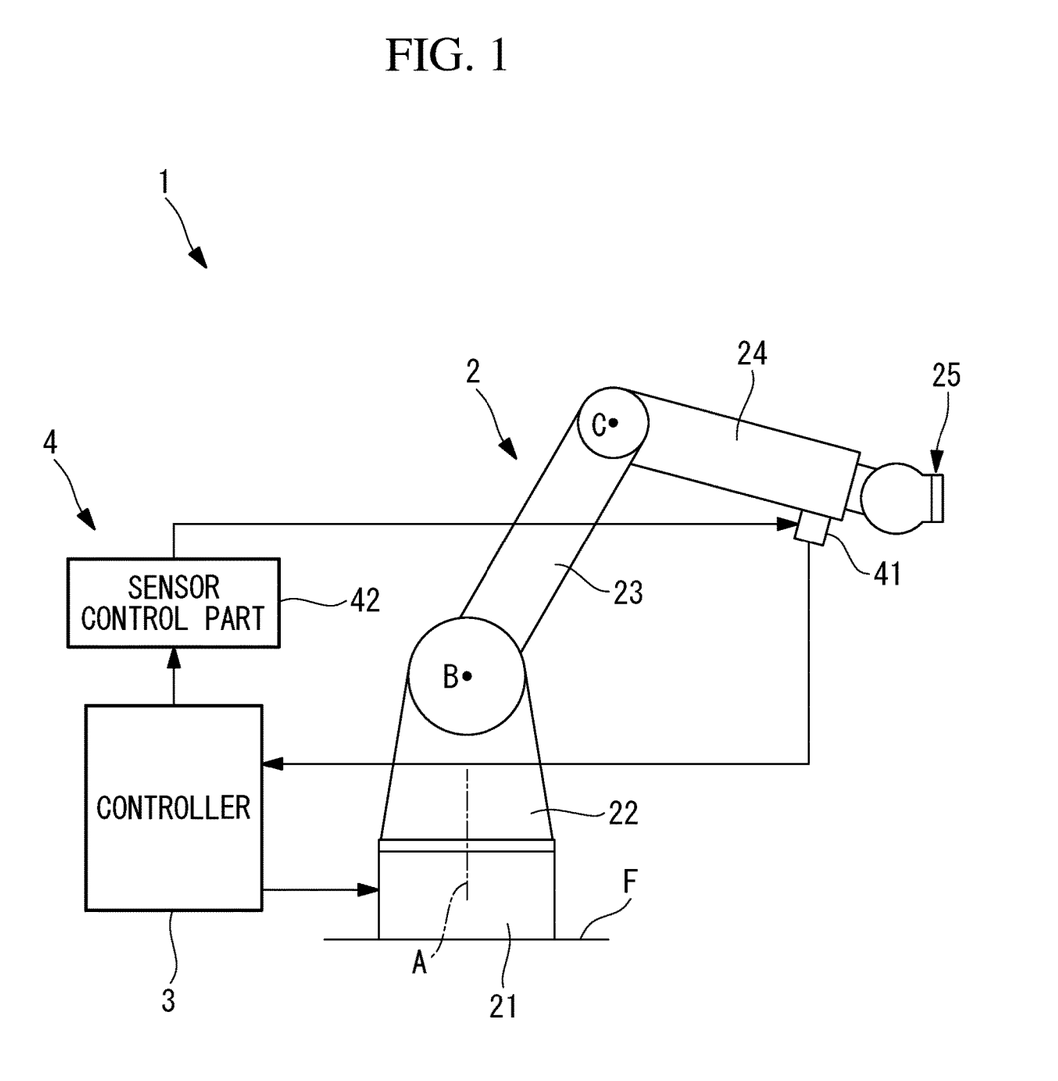
FIG. 1 is an entire configuration diagram illustrating a robot system and a monitor system for a robot according to an embodiment of the present invention.

As illustrated in FIG. 1, the robot system 1 according to the present embodiment is provided with the robot 2, a controller 3 for controlling the robot 2, and the monitor system 4 for the robot 2.

The robot 2 is, for example, a vertical articulated type robot. The type of the robot 2 is not limited, but any other form of the robot may be employed.

The robot 2 includes: a base 21 installed on a floor surface (installation surface) F; a turning cylinder 22 supported rotatably about a vertical first axis line A with respect to the base 21; a first arm (movable part) 23 supported rotatably about a horizontal second axis line B with respect to the turning cylinder 22; a second arm (movable part, arm) 24 having a longitudinal axis D supported rotatably about a horizontal third axis line C with respect to the first arm 23; and a wrist unit 25 supported at the tip of the second arm 24.

The robot 2 is provided with a motor (not illustrated) that drives each axis, and an encoder (not illustrated) that detects the angle of rotation of each axis.

The controller 3 drives each motor of the robot 2 in accordance with a previously taught motion program and controls parameters such as the angle and speed of each axis of the robot 2 by using the angle of rotation detected by the encoder.

The monitor system 4 for the robot 2 includes a sensor 41 mounted on the second arm 24, and a sensor control part (monitored region control part) 42 that controls the sensor 41.

The sensor 41 is, for example, a laser sensor for scanning a laser beam along the plane, has a monitored region AF spread radially about the sensor 41, measure the distance to an object disposed at a position where the object blocks the laser beam, to detect whether or not the object has entered the monitored region AF, and outputs a detection signal to the controller 3.

Figure 2:
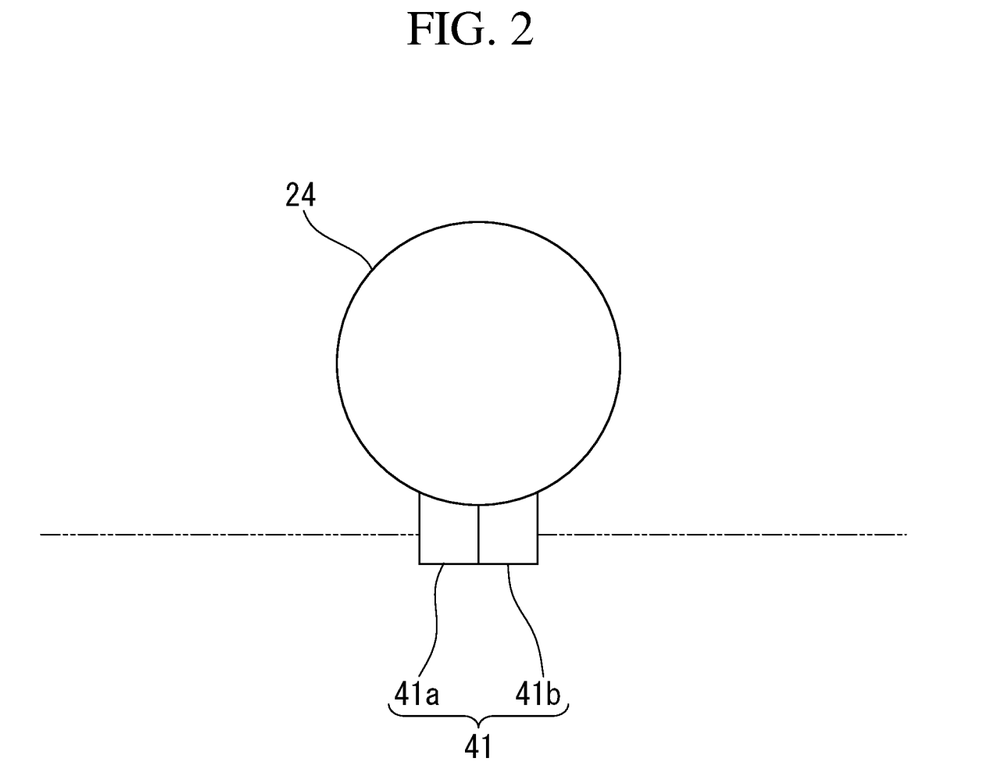
FIG. 2 is a schematic view for describing installation positions of sensors on the robot and monitored regions of the sensors in the monitor system for the robot in FIG. 1.
Figure 3:
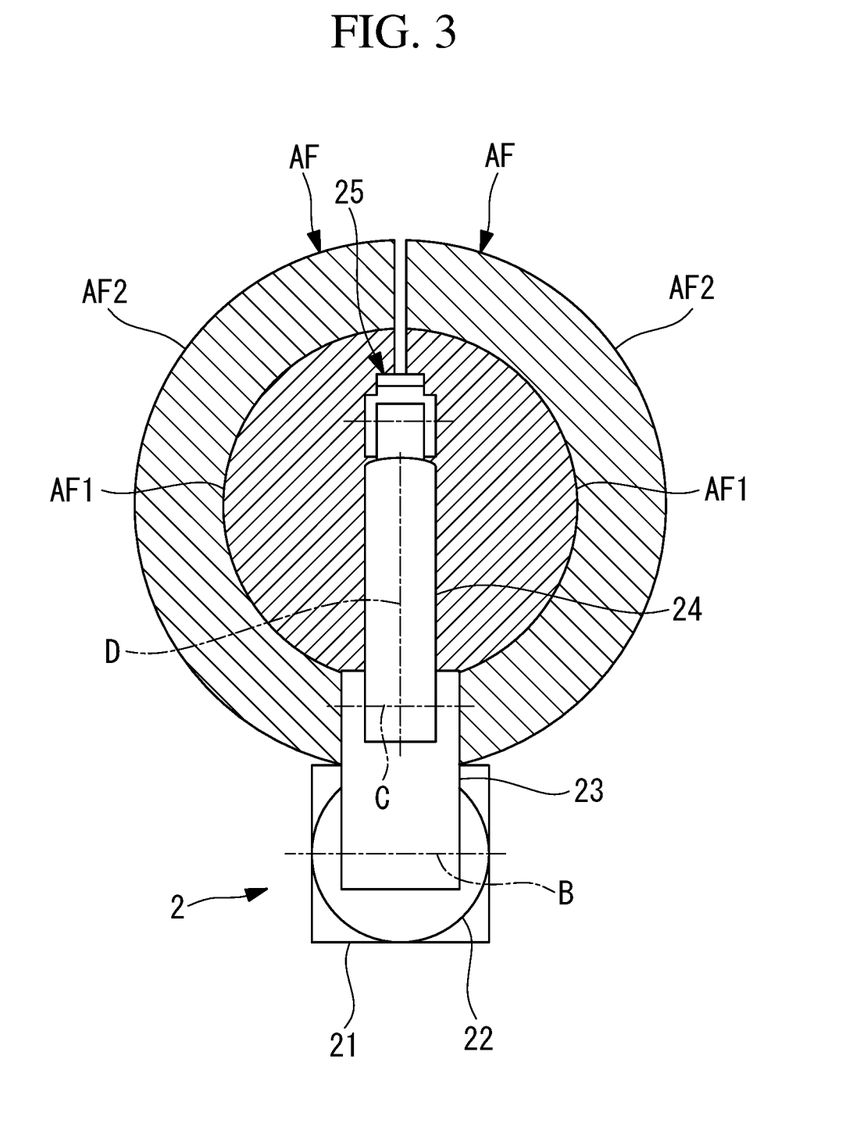
FIG. 3 is a plan view illustrating the monitored regions of the sensors in a state where a first axis of the robot stands still in the monitor system for the robot in FIG. 1.

As illustrated in FIG. 2, on the lower portion of the second arm 24, each one sensor 41 is disposed on each of both sides across the vertical plane that includes a longitudinal axis D of the second arm 24. As illustrated in FIG. 3, each of the sensors (first sensor and second sensor) 41*a*, 41*b* has the monitored region AF that is spread, from the vicinity of the vertical plane, in a semicircular shape along the plane orthogonal to the vertical plane.

The monitored region AF of each of the sensors 41*a*, 41*b* includes a stop area AF1 disposed at a position close to each of the sensors 41*a*, 41*b*, and a deceleration area AF2 disposed at a position distant from each of the sensors 41*a*, 41*b*.

The sensor control part 42 is connected to the controller 3 and the sensor 41. The sensor control part 42 receives a drive command signal for the robot 2 having been output from the controller 3, especially a drive command signal indicating the moving direction of the first axis of the robot 2, to control the monitored region AF of the sensor 41.

Figure 4:
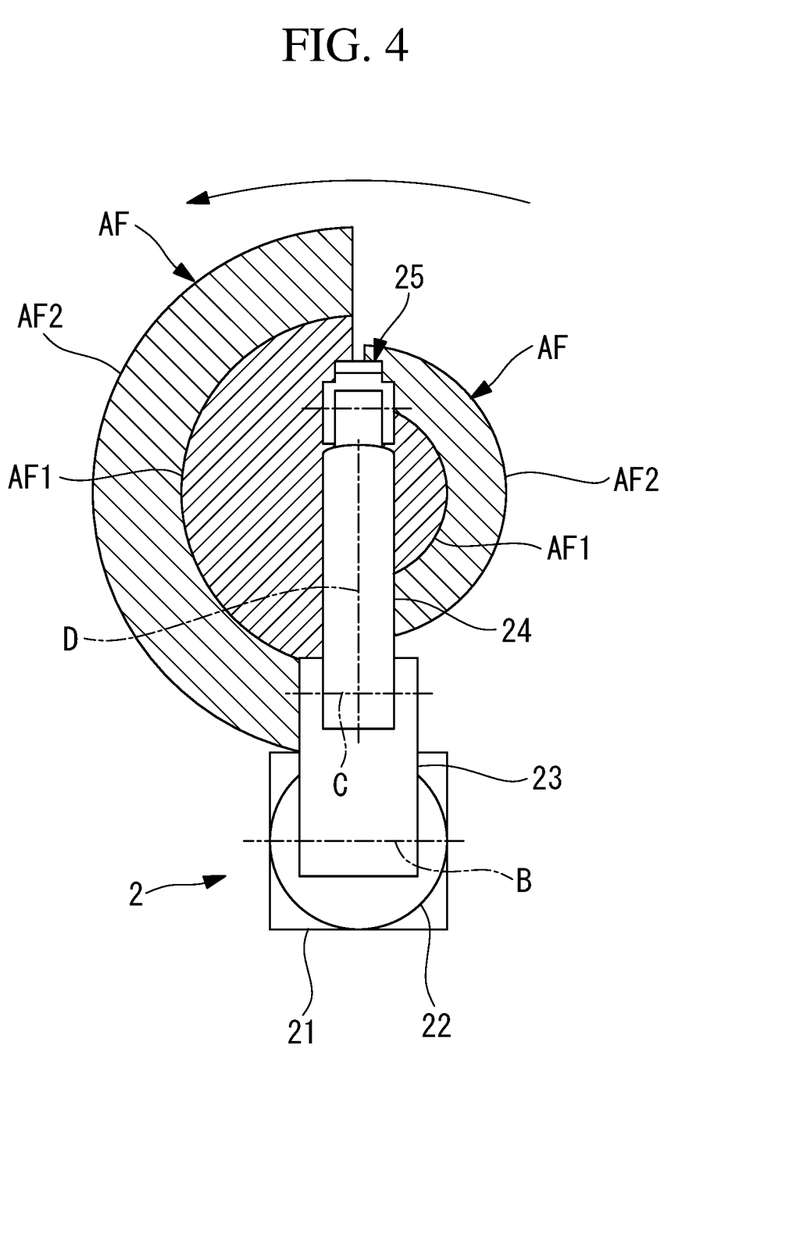
FIG. 4 is a plan view illustrating the monitored regions of the sensors in a state where the first axis of the robot is in motion in one direction in the monitor system for the robot in FIG. 1.

Specifically, in a state where the first axis of the robot 2 is not rotating, as illustrated in FIG. 3, the monitored regions AF of the two sensors 41*a*, 41*b* are even, but when the first axis of the robot 2 is moving in one direction, as illustrated in FIG. 4, the monitored region AF of the sensor 41*b* which is located at the rear in the moving direction is made smaller than the monitored region AF of the sensor 41*a* which is located at the front in the moving direction.

When the detection signal is input from the sensor 41, the controller 3 controls the robot 2 in accordance with the type of the detection signal. That is, when the detection signal for detecting the entry of the object into the deceleration area AF2 is input from the sensor 41, the robot 2 is controlled so as to decelerate the motion of each axis, or to avoid contact between the robot 2 and the detected object. Further, when the detection signal for detecting the entry of the object into the stop area AF1 is input from the sensor 41, the robot 2 is controlled so as to stop the motion of each axis.

The actions of the monitor system 4 for the robot 2 and the robot system 1 according to the present embodiment as thus configured will be described below.

According to the monitor system 4 for the robot 2 and the robot system 1 in the present embodiment, the sensor 41 mounted on the second arm 24 of the robot 2 forms the monitored region AF spread along the plane extending horizontally around the second arm 24, whereby the controller 3 can stop or decelerate the robot 2 when the entry of the object into the monitored region AF is detected. This makes it possible to avoid interference between the object and the robot 2.

In this case, when the first arm 23 and the second arm 24 which are the movable part are moved with respect to the base 21, the sensor 41 mounted on the second arm 24 also moves with the second arm 24, and the sensor control part 42 controls the monitored region AF of the sensor 41 based on the motion command signal for the robot 2, to make the monitored region AF at the rear in the moving direction smaller than the monitored region AF at the front in the moving direction. This case includes a case in which the monitored region AF at the rear in the moving direction is 0, that is, the monitored region AF at the rear in the moving direction does not exist.

Thereby, at the front in the moving direction where the object and the robot 2 rapidly come close to each other, a wide enough monitored region AF can be ensured to avoid the interference between the object and robot 2. On the other hand, at the rear in the moving direction where the object and the robot 2 are distant from each other, there is an advantage in that the object and the robot 2 are enabled to work as close as possible, thereby preventing unnecessary deceleration and stoppage of the robot 2 and improving the operating rate of the robot.

According to the present embodiment, since the sensor 41 is mounted on the second arm 24 that has the highest possibility of interference with the object, it is possible to reliably dispose the monitored region AF around the second arm 24 at each position on the second arm 24 where the sensor 41 is disposed. Thus, for the sensor control part 42, it is sufficient to mainly control only the size of the monitored region AF of each of the sensors 41*a*, 41*b*, and it is not necessary to control the position of the monitored region AF, whereby there is an advantage in that the control can be facilitated.

Figure 5:
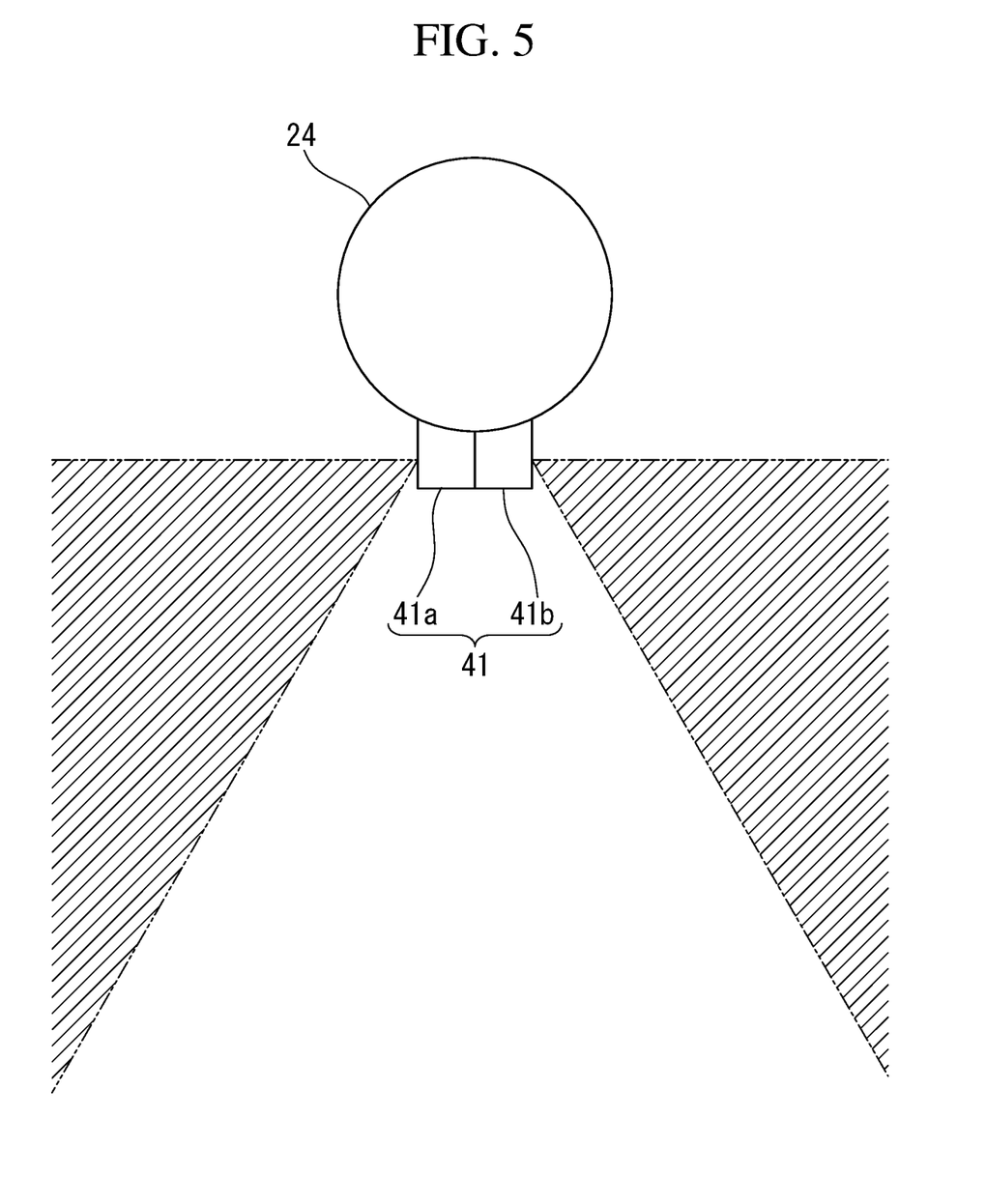
FIG. 5 is a schematic view illustrating a modification of the monitored regions in FIG. 2.

Each of the scanning sensors 41*a*, 41*b* for scanning the laser beam along the plane has been exemplified in the present embodiment, but as illustrated in FIG. 5, each sensor may scan the laser beam three-dimensionally to have a three-dimensional monitored region, or a distance sensor, a vision sensor, or the like capable of three-dimensionally detecting the distance may be employed instead of the laser sensor.

The control by the sensor control part 42 on the monitored region AF of each of the sensors 41*a*, 41*b* may be switched between the monitored regions AF of two types different in size, depending on whether the monitored region AF is at the front in the moving direction or the rear in the moving direction. The sensor control part 42 has controlled the monitored region AF of each of the sensors 41*a*, 41*b* in accordance with the drive command signal indicating the moving direction of the first axis of the robot 2, but the size, such as the radius, of the monitored region AF may be controlled stepwise or continuously in accordance with the move speed of the first axis. That is, the larger the move speed, the larger the monitored region AF at the front in the moving direction may be made, and/or the smaller the monitored region AF at the rear in the moving direction may be made.

The monitored region AF disposed on each of both sides across the vertical plane that includes the longitudinal axis D of the second arm 24 has been formed by each of the separate sensors 41*a*, 41*b*, but instead of this, the monitored region AF may be formed on each of both sides of the vertical plane by a single sensor.

Figure 6:
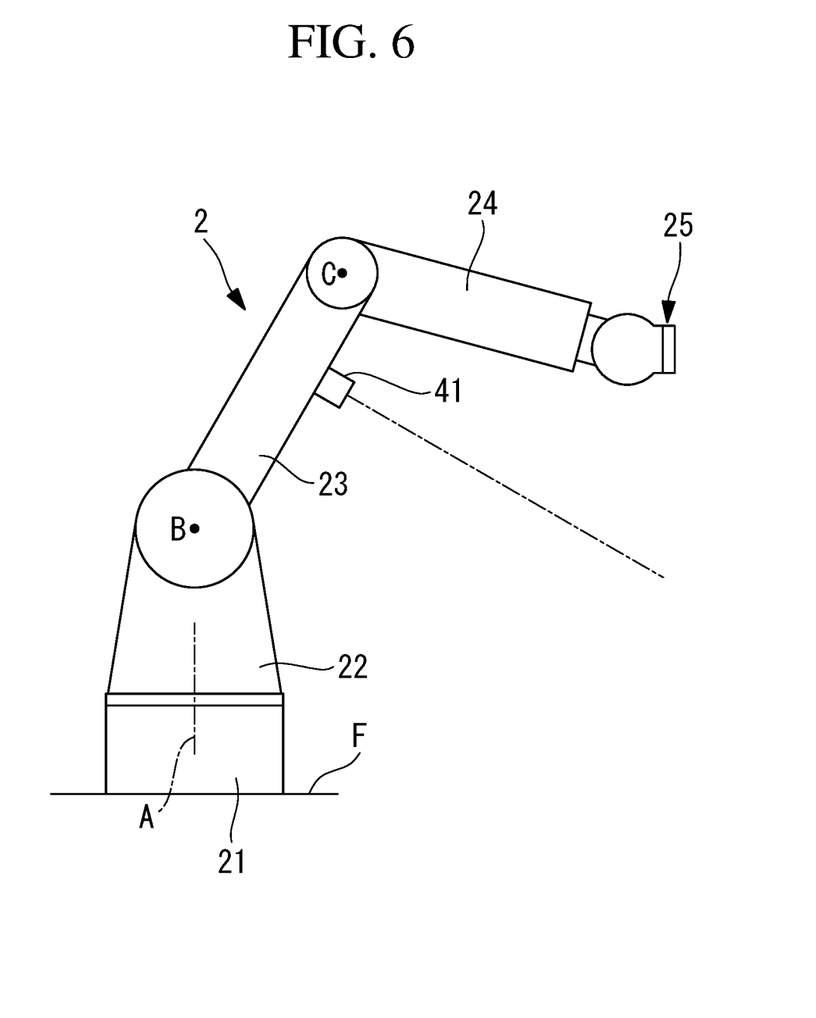
FIG. 6 is a side view illustrating a modification of the mounting position of the sensor in the monitor system for the robot in FIG. 1.
Figure 7:
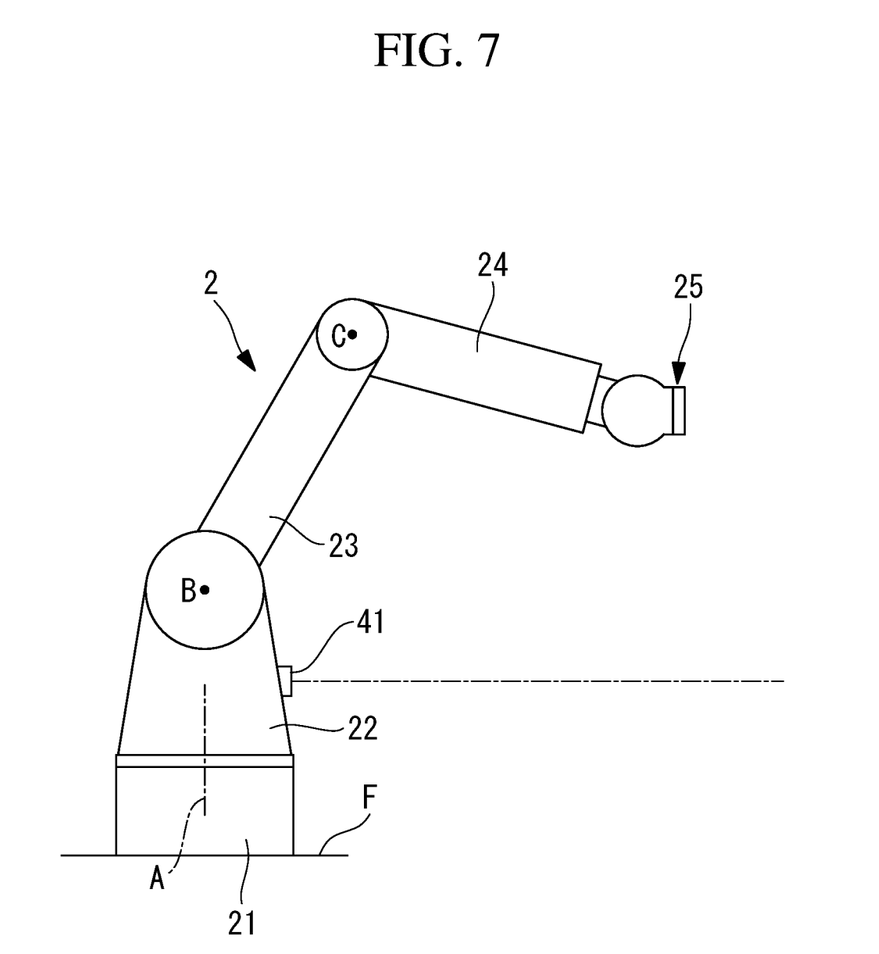
FIG. 7 is a side view illustrating a modification of the mounting position of the sensor in the monitor system for the robot in FIG. 1.
Figure 8:
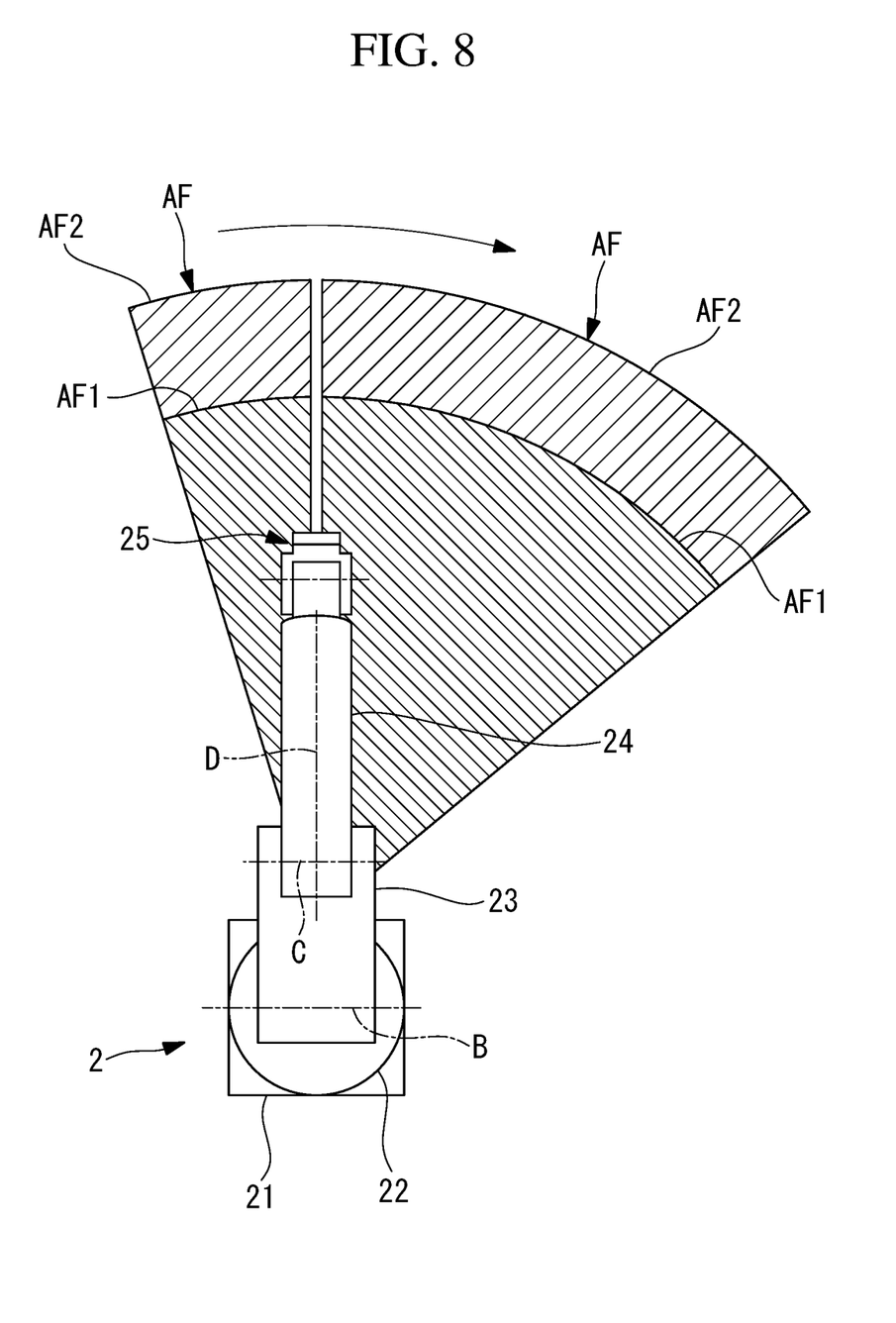
FIG. 8 is a plan view illustrating an example of the monitored regions of the sensors in FIG. 6 or FIG. 7.

Further, the sensor 41 has been mounted on the second arm 24, but instead of this, the sensor 41 may be mounted on the first arm 23 as illustrated in FIG. 6 or may be mounted on the turning cylinder 22 as illustrated in FIG. 7. In this case, as illustrated in FIG. 8, the monitor ranges at the front in the moving direction and at the rear in the moving direction may be made different in size by changing the angle range.

Alternatively, the sensor 41 may be fixed and disposed above the base 21 or the robot 2. In this case, since the monitored region AF does not move automatically with the motion of the robot 2, the position as well as the size of the monitored region AF may only be controlled in accordance with the motion of the robot 2.

Figure 9:
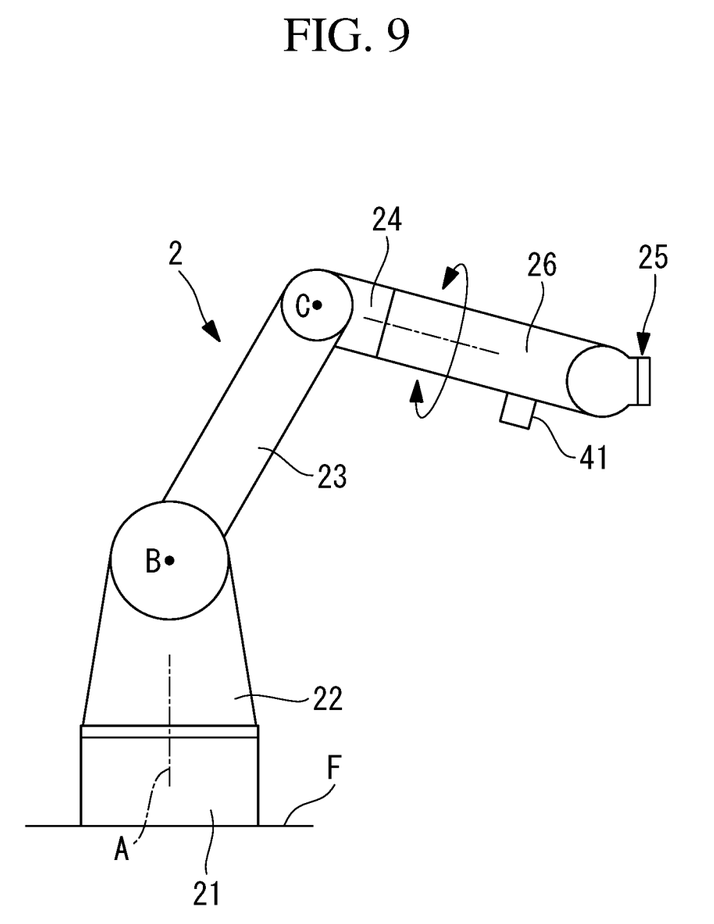
FIG. 9 is a side view illustrating a modification of the robot in the monitor system for the robot in FIG. 1.

Further, in the present embodiment, as illustrated in FIG. 9, the wrist unit 25 may include a rotatable, cylindrical first wrist element 26 about the longitudinal axis D with respect to the second arm 24, and the sensor 41 may be mounted on the first wrist element 26.

Figure 10:
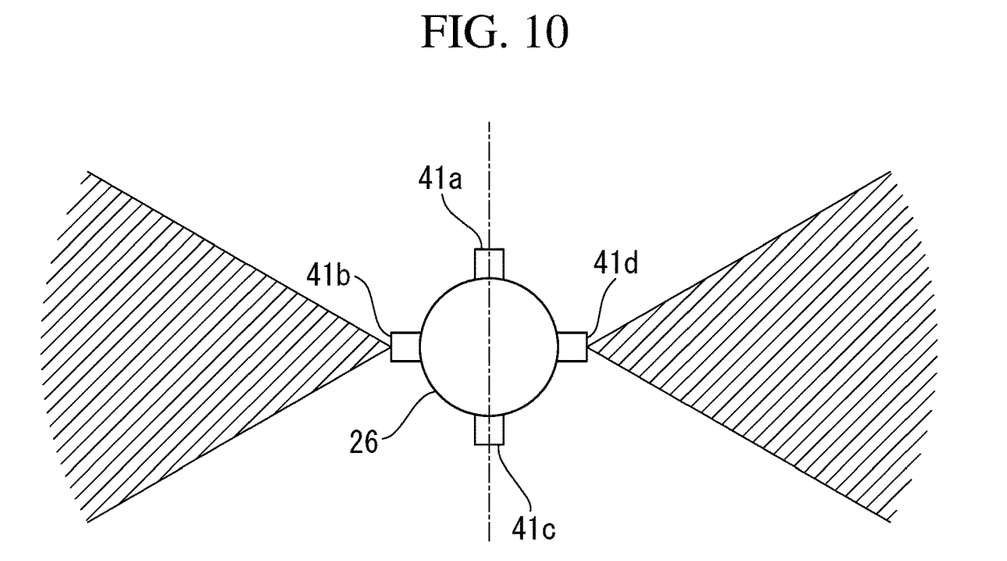
FIG. 10 is a schematic view illustrating sensors that are mounted on a first wrist element of the robot in FIG. 9 and an example of the monitored regions of the sensors.

In this case, since the monitored region AF of the sensor 41 also rotates with the rotation of the first wrist element 26, as illustrated in FIG. 10, a plurality of sensors, such as four sensors 41a, 41b, 41c, 41d, are preferably disposed at intervals in the circumferential direction about the longitudinal axis of the first wrist element 26.

Then, in addition to controlling the sizes of the monitored regions AF of the respective sensors 41a, 41b, 41c, 41d, the sensor control part 42 may switch among the sensor 41a, 41b, 41c, or 41d to be used in accordance with the angle of rotation of the first wrist element 26.

Figure 11:
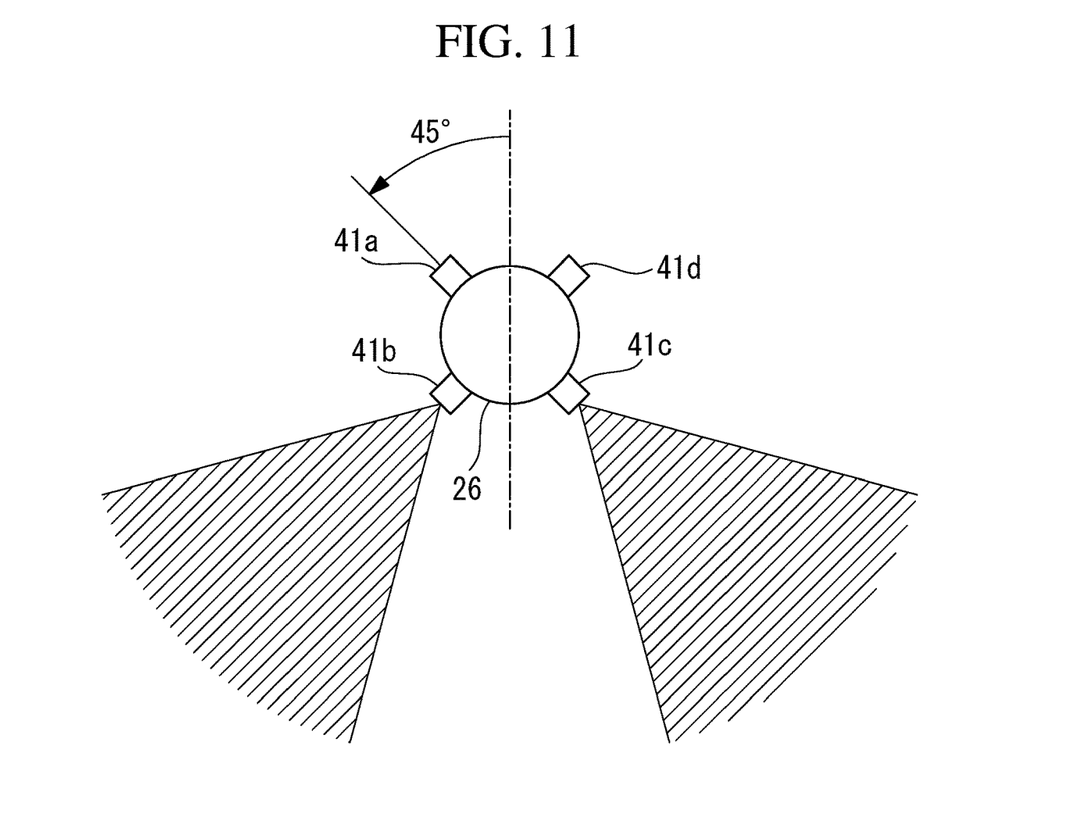
FIG. 11 is schematic view illustrating an example of the monitored regions when the first wrist element of the robot in FIG. 10 is rotated by 45° in one direction.
Figure 12:
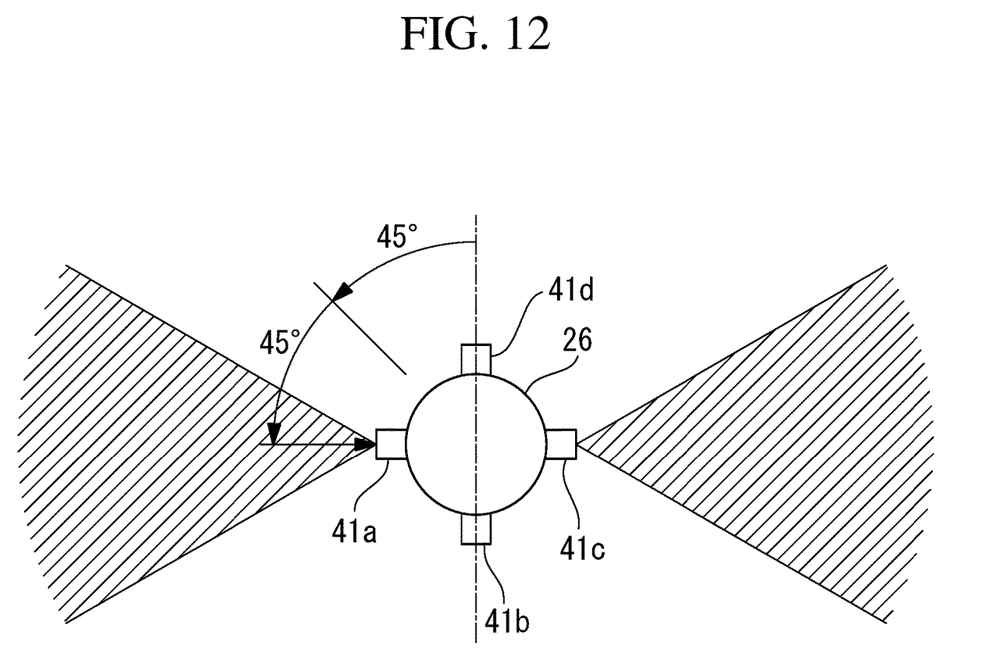
FIG. 12 is schematic view illustrating an example of the monitored regions when the first wrist element of the robot in FIG. 11 is further rotated by 45° in one direction.

That is, as illustrated in FIG. 10, in a state where the first wrist element 26 is disposed at the origin position, two sensors 41a, 41c, disposed on both sides in the horizontal direction across the first wrist element 26, are operated, and as illustrated in FIG. 11, at the point when the first wrist element 26 rotates by 45° in one direction about the longitudinal axis, two sensors 41b, 41c for disposing the monitored regions AF obliquely downward are operated. As illustrated in FIG. 12, when the first wrist element 26 further rotates by 45°, the two sensors 41a, 41c are disposed on both sides in the horizontal direction across the first wrist element 26 are operated.

As thus described, since the positions of the respective sensors 41a, 41b, 41c, 41d change with the rotation of the first wrist element 26, each time the positions change, the sensor control part 42 controls the sensor 41 in operation depending on whether the sensor 41 is the sensor 41a, 41b, 41c, or 41d disposed at the front in the moving direction or the sensor 41a, 41b, 41c, or 41d disposed at the rear in the moving direction with respect to the vertical plane that includes the longitudinal axis D, to make the monitored region AF of the sensor 41 disposed at the rear in the moving direction smaller than the monitored region AF of the sensor 41 disposed at the front in the moving direction.

As a result, the above-described embodiment leads to the following aspects.

One aspect of the present invention is directed to a monitor system for a robot that includes a base installed on an installation surface, and a movable part supported movably with respect to the base, the monitor system including: a sensor that monitors the presence or absence of an object around the robot, and a monitored region control part that controls a monitored region of the sensor based on a motion command signal for the robot. The sensor has the monitored region on each of both sides across a vertical plane that includes a central axis line of the movable part, and the monitored region control part makes the monitored region at the rear in a moving direction of the movable part smaller than the monitored region at the front in the moving direction of the movable part.

According to the present aspect, by the operation of the sensor, the monitored region is formed on each of both sides across the vertical plane that includes the central axis line of the movable part, and the object having entered the monitored region is detected by the sensor. The monitor area of the sensor moves following the movement of the movable part that is a hazardous source in contact with a human, so that the monitored region can be narrowed down to the minimum required as compared with a case in which the sensor monitors the entire movable range where the movable part may pass. Thereby, the human can come close to the robot to a position where the human does not enter the monitored region, and if the human enters the monitored region, the interference between the human and the robot can be avoided by stopping or decelerating the robot.

In this case, when the movable part is moved with respect to the base installed on the installation surface, the monitored region control part controls the monitored region of the sensor based on the motion command signal for the robot, to make the monitored region at the rear in the moving direction smaller than the monitored region at the front in the moving direction. Hence at the front in the moving direction where the human and the robot rapidly come close to each other, a wide enough monitored region is ensured, so that the interference between the human and robot can be avoided, and at the rear in the moving direction where the human and the robot are distant from each other, the human and the robot are enabled to work as close as possible, so that the operating rate of the robot can be improved.

In the above aspect, the sensor may be mounted on the movable part.

With this configuration, since the monitored region moves with the motion of the movable part, it is sufficient for the monitored region control part to mainly control only the size of the monitored region, and the control can thus be facilitated.

In the above aspect, the sensor may include a first sensor having the monitored region in one direction with respect to the vertical plane, and a second sensor having the monitored region in the other direction with respect to the vertical plane.

With this configuration, the monitored region control part may only control the monitored region of the first sensor and the monitored region of the second sensor individually, and hence the control can be facilitated.

Further, another aspect of the present invention is directed to a robot system including: a robot provided with a base installed on an installation surface, and a movable part supported movably with respect to the base; a controller that controls the robot; a sensor that monitors the presence or absence of an object around the robot; and a monitored region control part that controls a monitored region of the sensor based on a motion command signal for the robot from the controller. The sensor has the monitored region on each of both sides across a vertical plane that includes a central axis line of the movable part, the monitored region control part controls the monitored region at a rear in a moving direction of the movable part to be smaller than the monitored region at a front in the moving direction of the movable part, and the controller stops or decelerates the robot, or controls a motion of the robot so as to avoid contact with the object, based on a detection signal for the object from the sensor.

According to the present aspect, by the operation of the sensor, the monitored region is formed on each of both sides across the vertical plane that includes the central axis line of the movable part, and the object having entered the monitored region is detected by the sensor. Thereby, the human can come close to the robot to a position where the human does not enter the monitored region, and if the human enters the monitored region, the interference between the human and the robot can be avoided by the controller stopping or decelerating the robot, or controlling the motion of the robot so as to avoid contact with the object, based on a detection signal for the object from the sensor.

In this case, when the movable part is moved with respect to the base installed on the installation surface, the monitored region control part controls the monitored region of the sensor based on the motion command signal for the robot, to make the monitored region at the rear in the moving direction smaller than the monitored region at the front in the moving direction. Hence at the front in the moving direction where the human and the robot rapidly come close to each other, a wide enough monitored region can be ensured to avoid the interference between the human and robot, and at the rear in the moving direction where the human and the robot are distant from each other, the human and the robot are enabled to work as close as possible to improve the operating rate of the robot.

In the above aspect, the sensor may be mounted on the movable part.

In the above aspect, the movable part may include an arm that supports a wrist unit at a tip rotatably about a longitudinal axis, and the sensor may be fixed to the arm.

With this configuration, the sensor is mounted on the arm that does not rotate about the longitudinal axis, regardless of the posture of the wrist, it is possible to continue to monitor each of both sides across the vertical plane that includes the central axis line of the movable part.

In the above aspect, the movable part may include an arm that supports a wrist unit at a tip rotatably about a longitudinal axis, the wrist unit may include a first wrist element supported rotatably about the longitudinal axis with respect to the arm, the sensor includes a plurality of sensors, the plurality of sensors may be fixed to the first wrist element at intervals in a circumferential direction about the longitudinal axis, and the monitored region control part may switch among the sensors in accordance with an angle of rotation of the first wrist element about the longitudinal axis.

With this configuration, since the sensor is mounted on the first wrist element that rotates about the longitudinal axis with respect to the arm, when the first wrist element is rotated about the longitudinal axis, the monitored region of the sensor also rotates about the longitudinal axis. In this case, since the monitored region control part switches among the sensors in accordance with the angle of rotation of the first wrist element about the longitudinal axis, it is possible to constantly dispose the monitored region of a proper size on each of both sides across the vertical plane that includes the central axis line of the movable part.

In the above aspect, the monitored region may include a stop area close to the movable part, and a deceleration area disposed at a position more distant than the stop area from the movable area, the controller may decelerate the robot in response to the sensor detecting the object in the deceleration area, and the controller may stop the robot in response to the sensor detecting the object in the stop area.

With this configuration, when the object enters the monitored region, the immediate stoppage of the robot can be prevented, thus enabling improvement in the operating rate of the robot.

According to the present invention, there is produced an effect of being able to improve an operating rate of a robot while enabling a human and the robot to work as close as possible.

The invention claimed is:

1. A monitor system for a robot that includes a base installed on an installation surface, and a movable part supported movably with respect to the base, the monitor system comprising:
   a sensor that monitors presence or absence of an object around the robot, and
   a monitored region control part that controls a monitored region of the sensor based on a motion command signal for the robot,
   wherein
   the sensor has the monitored region on each of both sides across a vertical plane that includes a central axis line of the movable part to monitor both a front in a moving direction of the movable part and a rear in the moving direction of the movable part at a same time, and
   the monitored region control part makes the monitored region at the rear in the moving direction of the movable part smaller than the monitored region at the front in the moving direction of the movable part.

2. The monitor system for the robot according to claim 1, wherein the sensor is mounted on the movable part.

3. The monitor system for the robot according to claim 2, wherein the sensor includes a first sensor having the monitored region in one direction with respect to the vertical plane, and a second sensor having the monitored region in the other direction with respect to the vertical plane.

4. The monitor system for the robot according to claim 1, wherein as a move speed grows larger, the monitored region at the front in the moving direction grows larger, and/or the monitored region at the rear in the moving direction grown smaller.

5. A robot system comprising:
   a robot that includes a base installed on an installation surface, and a movable part supported movably with respect to the base;
   a controller that controls the robot;
   a sensor that monitors presence or absence of an object around the robot; and
   a monitored region control part that controls a monitored region of the sensor based on a motion command signal for the robot from the controller,
   wherein
   the sensor has the monitored region on each of both sides across a vertical plane that includes a central axis line of the movable part to monitor both a front in a moving direction of the movable part and a rear in the moving direction of the movable part at a same time,
   the monitored region control part controls the monitored region at the rear in the moving direction of the movable part to be smaller than the monitored region at the front in the moving direction of the movable part, and
   the controller stops or decelerates the robot, or controls a motion of the robot so as to avoid contact with the object, based on a detection signal for the object from the sensor.

6. The robot system according to claim 5, wherein the sensor is mounted on the movable part.

7. The robot system according to claim 6, wherein
   the movable part includes an arm that supports a wrist unit at a tip rotatably about a longitudinal axis, and
   the sensor is fixed to the arm.

8. The robot system according to claim 6, wherein
   the movable part includes an arm that supports a wrist unit at a tip rotatably about a longitudinal axis, the wrist unit includes a first wrist element supported rotatably about the longitudinal axis with respect to the arm, the sensor includes a plurality of sensors, the plurality of sensors are fixed to the first wrist element at intervals in a circumferential direction about the longitudinal axis, and the monitored region control part switches among the sensors in accordance with an angle of rotation of the first wrist element about the longitudinal axis.

9. The robot system according to claim 6, wherein the monitored region includes a stop area close to the movable part, and a deceleration area disposed at a position more distant than the stop area from the movable area, the controller decelerates the robot in response to the sensor detecting the object in the deceleration area, and the controller stops the robot in response to the sensor detecting the object in the stop area.

\* \* \* \* \*